United States Patent [19]

Taniguchi et al.

[11] Patent Number: 5,032,108
[45] Date of Patent: Jul. 16, 1991

[54] NON-STAGE TRANSMISSION FOR VEHICLE

[75] Inventors: Katuhiko Taniguchi; Hisao Uchiyama, both of Hamamatsu, Japan

[73] Assignee: Suzuki Jidosha Kogyo Kabushiki Kaisha, Shizuoka, Japan

[21] Appl. No.: 447,868

[22] Filed: Dec. 8, 1989

[30] Foreign Application Priority Data

Dec. 10, 1988 [JP] Japan .................. 63-312621
Dec. 10, 1988 [JP] Japan .................. 63-312622
Dec. 10, 1988 [JP] Japan .................. 63-312624
Dec. 13, 1988 [JP] Japan .................. 63-314515

[51] Int. Cl.⁵ .................................. F16H 61/00
[52] U.S. Cl. ............................. 474/28; 74/867
[58] Field of Search .............. 474/8, 11, 12, 17, 18, 474/25, 28, 69, 70; 74/866, 867

[56] References Cited

U.S. PATENT DOCUMENTS

| | | | |
|---|---|---|---|
| 4,526,061 | 7/1985 | Sakakibara et al. | 474/28 |
| 4,584,909 | 4/1986 | Abo et al. | 474/28 X |
| 4,669,336 | 6/1987 | Okada et al. | 474/28 X |
| 4,747,808 | 5/1988 | Moan | 474/18 X |

FOREIGN PATENT DOCUMENTS 58-121349 7/1983 Japan .
59-99165 6/1984 Japan .
59-126145 7/1984 Japan .

Primary Examiner—Thuy M. Bui
Attorney, Agent, or Firm—Flynn, Thiel, Boutell & Tanis

[57] ABSTRACT

A continuously variable non-stage transmission for a vehicle includes a pair of pulleys with a belt wound around them, and an arrangement cooperable with the pulleys for varying the radius of gyration of the belt. A fluid coupling, a reverse drive brake, a neutral clutch, and one of the pulleys are positioned in a row beginning at the vehicle engine and extending along a rotatable shaft. The fluid coupling includes a pump impeller, a turbine runner, and a stator wheel which is lockable against rotation by the brake to provide reverse rotation of the turbine runner. A direct clutch is built into the fluid coupling and prevents cavitation in the fluid coupling. An operating mechanism of the brake is fitted in a hollow cavity in the case of the transmission. The cavity is formed by a retaining portion of the transmission case, which retaining portion supports a bearing of the rotatable shaft.

3 Claims, 15 Drawing Sheets

FLUID COUPLING MODE
NORMAL DIRECTION
(AT ADVANCING)

PUMP　　STATOR　TURBINE
IMPELLER　WHEEL　RUNNER

TORQUE CONVERTOR MODE
REVERSE DIRECTION
(AT REVERSING)

PUMP　　STATOR　TURBINE
IMELLER　WHEEL　RUNNER

NON-STAGE TRANSMISSION FOR VEHICLE

FIELD OF THE INVENTION

The present invention relates to a non-stage automatic transmission for vehicles and, particularly, to a non-stage automatic transmission for varying the groove widths between adjustable pulleys to change the reduction ratio and thereby control the speed of the vehicle.

BACKGROUND OF THE INVENTION

In vehicles, transmissions connect between internal combustion engines and driving wheels. The transmission controls the driving force of driving wheels and the driving speed, depending on a driving condition varying extensively, and thus sufficiently optimizes the performance of an internal combustion engine. Among a variety of transmissions, there is a belt driving type of non-stage automatic transmission. This type of transmission serves to change, by hydraulic pressure, the groove widths formed between respective driving and driven adjustable pulleys. Thus, by varying the radius of a belt wound around the driving and driven pulleys, the reduction ration (belt ratio) relative to a driving force transmitted by the belt may be changed.

This type of non-stage automatic transmission for a vehicle is disclosed in Japanese Patent No. 59-126145. In the control device of the transmission disclosed in this patent, the reduction ratio of the control mechanism is controlled at the up-shift side when the number of revolutions increases higher than a predetermined number, and the reduction ratio is controlled on the down-shift side when the number of revolutions decreases lower than a predetermined number of revolutions. Thus, in the transmission, an acceleration feeling is caused from increasing the number of engine revolutions and the response to increasing torque in pushing down an accelerator pedal is improved, and hunting is prevented by the speed control.

A further problem in the existing non-stage transmissions is that the torque convertor, the oil pump, the driving pulley, the clutch, and the brake are positioned in a row from the engine side along a driving side shaft of the transmission. It is difficult and practically disadvantageous to arrange such a transmission in the limited engine space, because the overall length is large. In addition, the belt-pulley arrangement requires a multi-shaft structure which, because of the layout of bearings which support multiple shafts, structure is complicated and inevitably leads to high costs and economic disadvantages.

Accordingly, an object of the present invention is to provide a non-stage automatic transmission which can be composed in smaller size and easily arranged in the engine space or room. This object is addressed by positioning in turn a fluid coupling having normal and reverse rotating functions, an oil pump producing a driving hydraulic pressure, a reverse driving brake, a forward-reverse shift clutch, and an adjustable driving pulley in a row from engine side along the driving rotation shaft of the transmission.

Another non-stage transmission is disclosed in Japanese Patent No. 59-99165. In a hydraulic pressure controlling device of the non-stage automatic transmission for a vehicle which was disclosed in this patent, an input shaft of a belt type of non-stage automatic transmission is an output shaft, and on the output shaft, a non-stage automatic transmission, a planetary gear for shifting advance and reverse, an oil pump, and a three-element one-stage type of torque convertor are in turn positioned from the engine side.

Also, in Japanese Patent No. 58-121349, this type of transmission is disclosed. In a hydraulic pressure controlling device of the non-stage automatic transmission disclosed in this patent, on an output shaft of an engine, a three-element one-stage type of torque converter, a driving pulley, and an oil pump are in turn positioned from the engine side, and on a shaft of a driven pulley, a multi-plate clutch for shifting advance and reverse, and a driving gear for advance and reverse are laid in order.

Also in the existing non-stage transmission for a vehicle, a torque convertor (a fluid coupling of PTS type in which a pump impeller, turbine runner, and a stator are in turn positioned, or of PST type in which a pump impeller, a stator and a turbine runner are in turn positioned) is used, and the stator of the torque convertor is either locked or freely rotatable, whereby it serves to operate as a reverse rotation torque convertor or a normal rotation fluid coupling, respectively.

However, since a brake and a direct clutch usually do not interlock together, a fluid coupling, for example, a torque convertor is in a condition which they are apt to slip with respect to each other, and a problem of reduced efficiency of driving power arises.

Besides, locating a direct clutch, as used for reversing, outside a torque convertor, for example, on the end or side opposite to the input side of an input shaft, makes large the overall length of a non-stage transmission. Therefore it is difficult to arrange the transmission in the limited space of the engine room due to this enlarged size.

Then, another object of the invention is, in order to improve the above-mentioned problem, to provide a non-stage transmission with a fluid coupling having a pump impeller, a stator to be locked by a brake, and a turbine runner in turn positioned and installed therein, and having a built-in direct clutch so as to prevent cavitation Thus, secure prevention of cavitation allows transmission efficiency of driving-power to be improved and, moreover, ensures a function as a damper by slipping of the direct clutch.

By comprising components as described above, when locking the stator with the brake, cavitation can be prevented to improve transmission efficiency of driving-power by engaging the direct clutch in the fluid coupling in interlocking with the brake, and the size of the non-stage transmission can be minimized. Moreover, a function of a damper can be ensured.

It was also devised to install a fluid coupling for shifting a direction of rotation of the belt to advance or reverse the vehicle. The fluid coupling has a pump impeller rotatably connected with the internal combustion engine, a rotating stator which can be locked by a braking mechanism, and a turbine fixed on an output side shaft which is in turn positioned on the pulley side. By releasing or locking the stator, the turbine rotates normally or reversely to shift the direction of rotation of the belt, and thus advance or reverse the vehicle.

However, in the known non-stage transmission equipped with a fluid coupling having a braking mechanism releasing and locking the stator to shift the direction of rotation of the turbine in the fluid coupling, a working mechanism operates the braking mechanism, and other components are in turn positioned in a row so that the overall length is large and requires a long space for accommodating these components. This makes it difficult to arrange the transmission in the limited engine room. Thus, this enlargement of the transmission is practically disadvantageous.

Therefore, a further object of the invention is to design a minimally-sized non-stage transmission equipped with a fluid coupling and which can be easily arranged in an engine room. This object is addressed by installing a braking operator of a working mechanism which operates a braking mechanism in a hollow portion formed inside of a retaining portion of a brake side casing, which casing also holds a bearing supporting an output side shaft of the fluid coupling. Such a construction makes it unnecessary to arrange a braking operator together with other components in a row in a non-stage transmission, so the non-stage transmission equipped with a fluid coupling can be made smaller in overall length and can be designed to a minimum size and length. Thus, the smaller non-stage transmission has the advantage of arrangement.

A further problem in traditional non-stage automatic transmissions is that the transmission case in which the mechanisms are supported has many components and therefore access to the mechanisms in the transmission case is difficult. That is, in traditional non-stage automatic transmission 200, for example as shown in FIG. 15, a transmission case 202 comprises a main case 204, a front case 206 fitted between the main case 204 and internal combustion engine (not shown), a rear case 208 fitted on the side of the main case 204 opposite the internal combustion engine, a subcase 210 fixed in said main case 204, and a rear cover case 212 fitted on the side of the main case 204 opposite the internal combustion engine. A belt type transmission mechanism 214 is installed and enclosed by the rear case 208 and the rear cover 212. A driving side shaft 216 and a driven side shaft 218—or rotation shafts—are each supported at one axial end by said front case 206, and at the other axial end by the main case 204 respectively. Also, a transfer gear 222 and a differential gear 224 composing a driving-power transmitting mechanism 220 are installed and enclosed by said front case 206 and said subcase 210 fixed in said main case 204. A transfer gear shaft 226—or a rotation shaft of the transfer gear 222—is supported at one axial end by said front case 204, and at the other axial end by said subcase 210. A differential gear case 228—a rotation shaft of the differential gear 224—has one axial end supported by the front case 206, and another axial end supported by said main case 204.

Meanwhile, as shown in FIG. 16, another known transmission case 302 of a non-stage automatic transmission 300 comprises a main case 304, a front case 306 fitted on the side of the main case 304 close to an internal combustion engine (not shown), a rear case 308 fitted on the side of the main case 304 opposite the internal combustion engine, a subcase 310 fixed on said main case 304, a front cover case 312 fitted on the side of the front case 306 close to the internal combustion engine, and a rear cover case 314 on the side of the rear case 308 opposite the internal combustion engine. A belt type transmission mechanism is installed and enclosed by said main case 304, said front case 306, said rear case 308, and said subcase 310. A driving side shaft 318 and a driven side shaft 320 have respective axial ends supported by said main case 304 and said front case 306, and respective opposite axial ends supported by said rear case 308 and said subcase 310. Also, a transfer gear 324 and a differential gear 326 composing a driving-power transmitting mechanism are installed and enclosed by said front case 306, said front cover case 312, and said main case 304. Transfer gear shaft 328—a rotation shaft of a transfer gear 324—has one axial end supported by said front case 306, and another axial end supported by said main case 304. A differential gear case 330—a rotation shaft of the differential gear 326—has one axial end supported by said front case 306, and another axial end supported by said main case 304.

As described above, in the known non-stage automatic transmission 200 of FIG. 15, the transmission case 202 comprises the main case 204, the front case 206, the rear case 208, the subcase 210, and the rear cover 212. Thus, including an oil pan (not shown) fitted on the transmission case 202, the number of case members forming the transmission case 202 amounts to six. Also, in the non-stage automatic transmission for a vehicle 300 shown in FIG. 16, the transmission case 302 comprises the main case 304, the front case 306, the rear case 308, the subcase 310, the front cover 312, and the rear cover 314. Including an oil pan (not shown) fitted on the transmission case 302, the number of case members amounts to seven. Accordingly, the traditional non-stage automatic transmission has the disadvantage of a large number of case members which is accompanied by rising costs, and carrying out maintenance is not easy because of difficult access to the mechanisms in the transmission case.

Thus, another object of the invention is to provide a non-stage automatic transmission for a vehicle in which the number of components composing the transmission case can be reduced, and in which each mechanism in the transmission case is simply accessible to easily carry out maintenance. This object is addressed by providing a transmission case which comprises a main case, and front and rear cases respectively fitted on the main case, such that one axial end of each rotation shaft of said mechanism is supported, enclosed, and installed by the main case, and another axial end of each rotation shaft of each mechanism is supported, enclosed, and installed by either said front case or said rear case. Thus, the construction has at least two less case elements than the known cases, and each mechanism will be easily accessible by removing either the front case the rear case.

DETAILED DESCRIPTION

Figure 1:
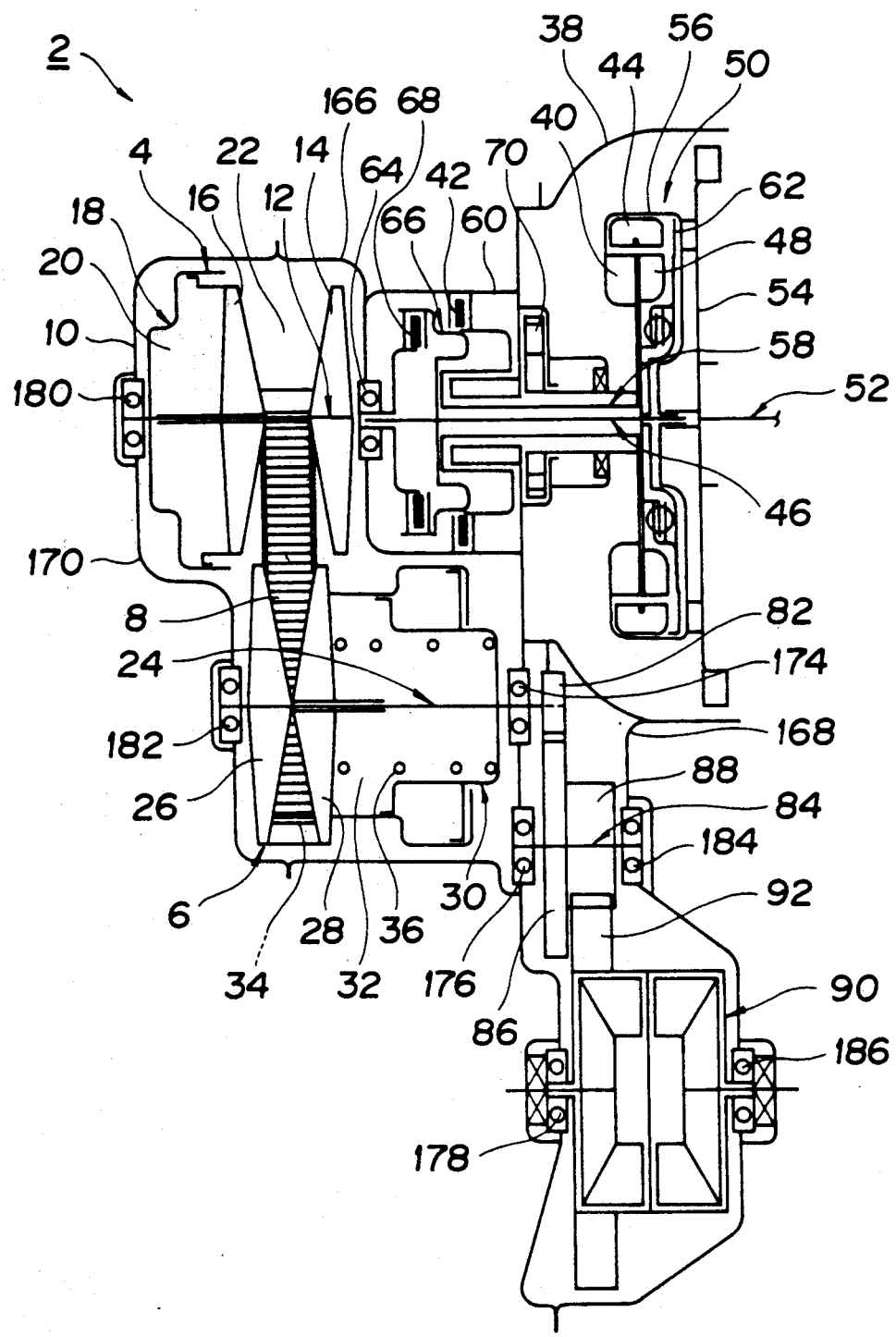
FIG. 1 is a schematic sectional view showing a non-stage transmission equipped with a fluid coupling.

A detailed description will be hereinafter made of the embodiments of the invention with reference to the drawings.

In the drawings (FIGS. 1 and 2), 2 is a non-stage transmission for a vehicle, 4 is an adjustable driving side pulley, 6 is an adjustable driven side pulley, and 8 is a belt. The driving side pulley 4 has a pulley member or half 14 axially and nonrotatably fixed on a driving side shaft 12 and a pulley member or half 16 nonrotatably attached on the driving side shaft 12 but movable axially with respect thereto. Oil is conducted into an oil chamber 20 between the pulley member 16 and a housing 18 positioned on the back side of the pulley member 16. The pulley member 16 is axially moved with respect to the shaft 12 by applying hydraulic pressure thereto, and thus the width of a driving groove 22 formed between the pulley members 14 and 16 is varied.

Moreover, the driven side pulley 6 has a pulley member or half 26 axially and nonrotatably fixed on a driven side shaft 24 and a pulley member or half 28 nonrotatably attached on the driven side shaft 24 but movable axially with respect thereto. Oil is conducted into an oil chamber 32 formed between the pulley member 28 and a housing 30 positioned on the back side of the pulley member 28. The pulley member 28 is axially moved with respect to the driven side shaft 24 by applying hydraulic pressure thereto, whereby the width of the groove 34 formed between the pulley members 26 and 28 is varied. In the oil chamber 32, a pressing spring 36, urging the member 28 toward the pulley member 26, is compressively positioned.

The belt 8 is wound around the driving side groove 22 of the driving side pulley 4 and the driven side groove 34, and is tensioned between the pulleys 4 and 6.

In a housing 38 located between the engine and the driving side pulley 4, a fluid coupling (i.e. a torque convertor) 50 is positioned and has a pump impeller 40 connectedly positioned at the side of the internal combustion engine, a stator 44 locked by a braking mechanism 42, and a turbine runner 48 fixed on an output side shaft 46 connected with the driving side shaft 12 on the pulley side. The turbine runner 48 can rotate normally and reversely by releasing and locking the stator wheel 44, thus enabling the output side shaft 46 to rotate normally and reversely and to change the direction of rotation of the belt 8. A drive plate 54 for driving the fluid coupling 50 is fixed on an internal combustion engine output shaft 52. The fluid coupling 50 has the pump impeller 40, stator wheel 44, and turbine runner 48 disposed in a coupling side housing 56. The pump impeller 40 is connected with the drive plate 54 through the coupling side housing 56. Also, the stator wheel 44 is connected with the braking mechanism 42, as fitted inside of a brake side casing 60 positioned between the pulley side housing 10 and the coupling side housing 56, through a first connecting member 58. Thus, the stator wheel 44 can be locked and released from the brake side casing 60 according to the operating condition of the braking mechanism 42. Moreover, in the coupling side housing 56, a direct clutch 62 is positioned to engage the coupling side housing 56 and the turbine runner 48 with each other or to separate them from each other. That is, the direct clutch 62 can connect the internal combustion engine output shaft 52 and the output side shaft 46.

Figure 7:
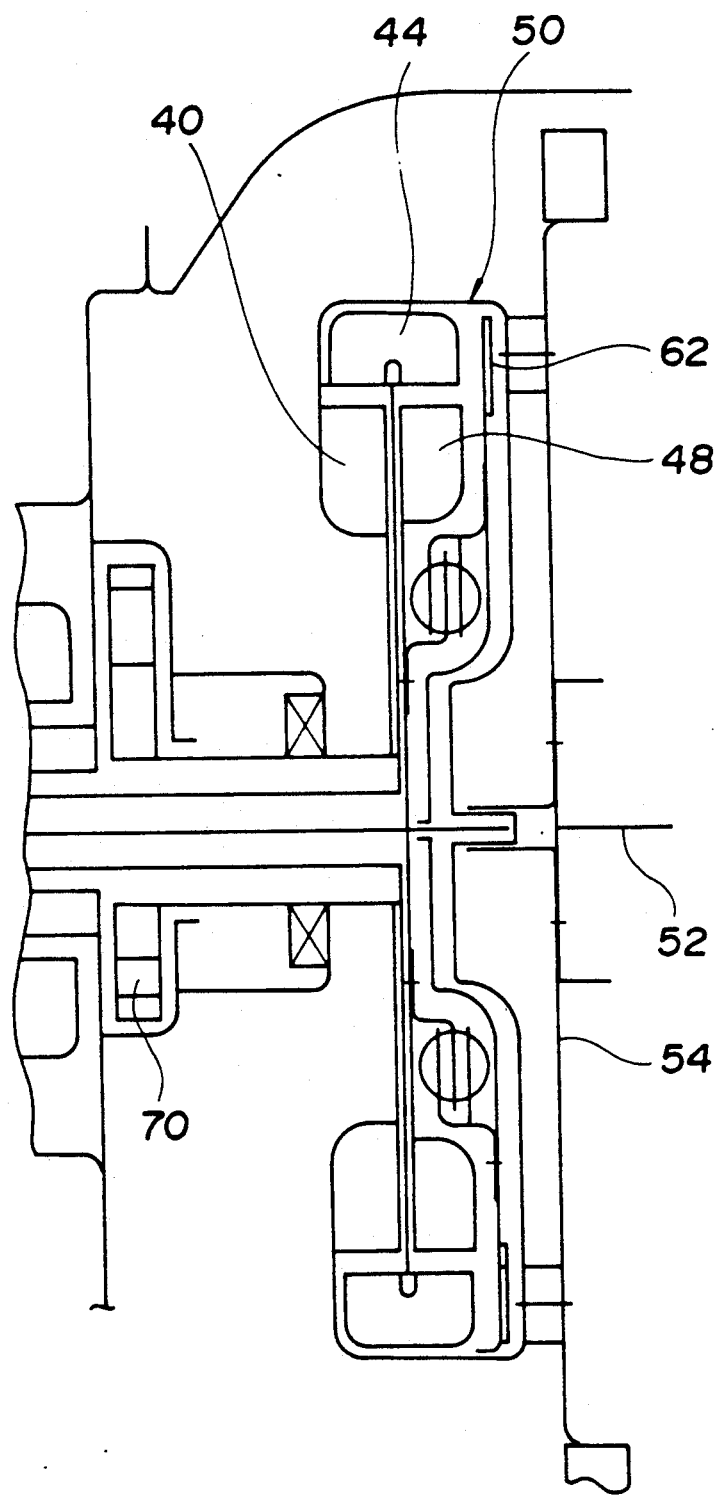
FIG. 7 is an enlarged detailed sectional view of the fluid coupling of FIG. 1.

In the torque convertor 50, the direct clutch 62 is built in the torque convertor to prevent a cavitation by engaging and releasing in interlocking with the brake 42. When fitting the direct clutch 62 in the torque convertor 50, as shown in FIGS. 1 and 7, the pump impeller 40, the stator 44, the turbine runner 48, and the direct clutch 62 are in turn positioned along the direction of hydraulic pressure fluid circulation in the torque convertor 50.

Figure 5:
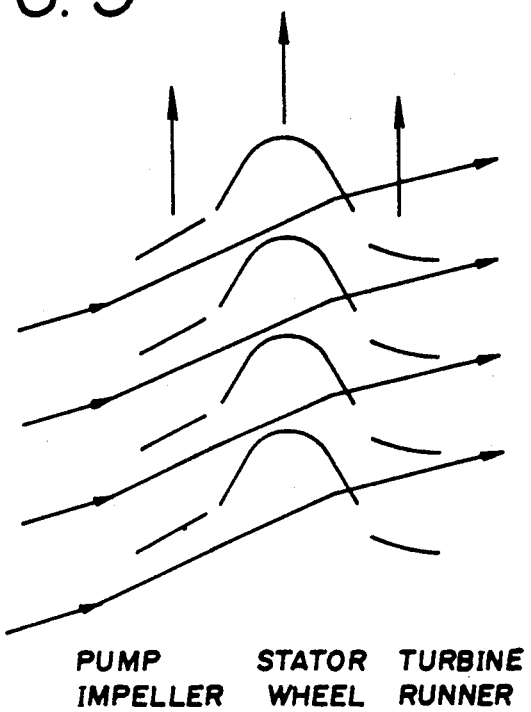
FIG. 5 is a schematic diagram showing the status of the fluid coupling with its turbine runner rotating in the normal direction.

Thus, when said stator 44 is not locked on the transmission case 60 by the brake 42, the direct clutch 62 is able to be engaged, and the oil passes freely through the stator 44, flowing into the front side of the turbine runner 48. Thus, as shown in FIG. 5, the fluid coupling comes into a mode of fluid coupling and in a phase of normal direction (normal rotation).

Figure 6:
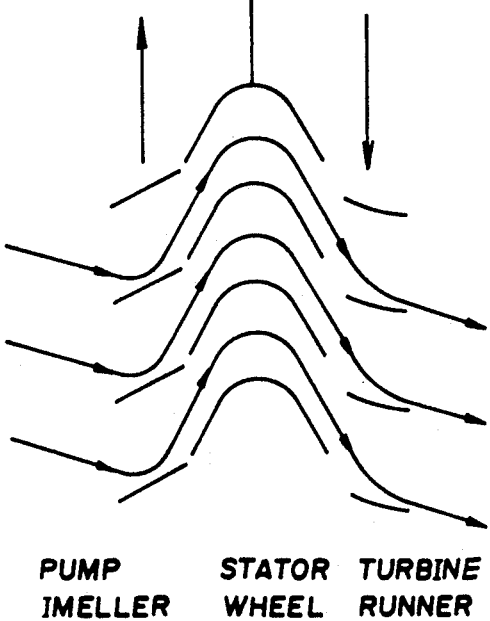
FIG. 6 is a schematic diagram showing the status of the fluid coupling with its turbine runner rotating in the reverse direction.

When the stator 44 is locked to the transmission case 60 with the brake 42 applied through a line pressure, sure, the direct clutch 62 is not engaged and the oil reverses the direction of flow in the stator 44 and flows into the back side of the turbine runner 48. Thus, as shown in FIG. 6, the fluid coupling 50 comes into a mode of torque convertor and in a phase of reverse direction (reverse rotation).

Moreover, by controlling an operation of the direct clutch 62 properly, it is possible to produce, as desired, a slip between the pump impeller 40 and the turbine runner 48. Thus, a damping function is created by the torque convertor.

Further, when the direct clutch 62 operates, that is, when it is disconnected upon reverse operation, the normal reversing state cannot be assured, so that upon reverse operation, the direct clutch 62 is not moved with a pressure in the direction such as to remove the direct clutch away from the drive plate 54 while interlocking with the brake 42, that is, toward the side of the turbine impeller 48.

Thus, cavitation can be securely avoided by the direct clutch 62, and improved transmission efficiency of driving power from the pump impeller 40 to the turbine runner 48 can be achieved.

In addition, fitting the direct clutch 62 into the torque convertor 50 enables the total length of the non-stage transmission to be made smaller, that is, the non-stage transmission can be minimized in size and can be easily arranged in the limited engine room.

Besides, by properly controlling operation of the direct clutch 62 to slip the clutch, a desired slip can be produced between the pump impeller 40 and the turbine runner 48. Thus, a damping function can be imparted to said torque convertor, and the non-stage transmission will therefore be improved in usage.

Meanwhile, another end of the output side shaft 46 fixing the turbine 48 is supported with an intermediate bearing 64. Also, a second connecting member 66 is fixed on the output side shaft 46 and connected with a neutral clutch 68.

The neutral clutch 68 operates depending upon the hydraulic pressure and connects and disconnects the output side shaft 46 and the driving side shaft 12. Thereby, the turbine runner 48 can be intermittently connected with the driving side pulley member 14 by the neutral clutch 68. That is, the locking and releasing of the neutral clutch 68 causes power transmitted from the turbine runner 48 to the output side shaft 46 to be intermittently transmitted, through the driving pulley 4 and the driven pulley 6, to the following power transmission device, and thus a neutral condition is also possible.

The normal and reverse rotation of the turbine runner 48 of the fluid coupling 50 is as shown in FIGS. 5 and 6. That is, releasing the braking mechanism 42 from the brake side casing 60 causes the stator wheel 44 to rotate freely, and the oil passing through vanes of the stator wheel 44 rotates the turbine runner 48 in the same direction as the pump impeller 40, that is, in the normal direction (refer to FIG. 5). Otherwise, locking the braking mechanism 42 with the brake side casing 60 causes the rotation of the stator wheel 44 to be blocked, and the direction of kinetic energy transmitted from the pump impeller is reversed by the vanes of the stator wheel 44, and the oil flows into the vanes of the turbine runner 48, and thereby the turbine runner rotates in the direction reverse to the pump impeller 40 (FIG. 6). Accordingly, since the shift of normal and reverse rotation of the output side shaft 46, or the shift of rotation of the belt 8, either of them is made through the turbine runner 48, locking and releasing the neutral clutch 68 can ensure the conditions of driving and neutral.

Moreover, the coupling side housing 56 forms with the turbine runner 48 a body which is connected to the oil pump 70. Therefore the oil pump 70 will be directly operated by the internal combustion engine side shaft 52.

The oil pump 70 connects with the hydraulic chambers 20 and 32 through oil passages (not shown).

The fluid coupling 50 may be, for example, a three-element one-stage type of torque convertor. The oil pump 70, the reverse driving brake 42, a forward-reverse shift clutch 68, and the driving pulley 4 are in turn positioned in line from the engine side. Meanwhile, along the flow of hydraulic pressure circulation, the pump impeller 40, a stator wheel 44, turbine runner 48, and wet direct clutch 62 utilizing friction are in turn positioned, and the direct clutch 62 is built in the torque convertor.

In the belt drive type of non-stage automatic transmission 2, the oil pump 70 operates according to the rotation of the engine side shaft 52, and the oil is sucked from the bottom of the transmission. The pump or line pressure is applied to the torque convertor and other components respectively, passing through a line pressure control valve (not shown).

Moreover, when said stator wheel 44 is not fixed to the transmission case 60 by the brake 42, the direct clutch 62 is able to be engaged and the oil flows into the front of the turbine runner 48 passing through the stator wheel 44. Thus, as shown in FIG. 5, the flow of oil is in the fluid coupling mode and is in the phase of normal direction (normal rotation).

On the contrary, when said stator wheel 44 is fixed to the transmission case 60 by the brake 42 receiving line pressure, the direct clutch 62 is not engaged, then the oil redirects and flows reversely into the back side of the turbine runner 48, as shown in FIG. 6, and the flow of oil is in the torque convertor mode and is in the phase of reverse direction (normal rotation).

Moreover, in usual automatic transmissions, combinations of each shift point—P (parking), R (reverse), N (neutral), D start (drive starting), and D cruise (drive cruising), and said reverse driving brake 42 and forward-reverse shift clutch 68 are as follows:

|   | direct clutch (62) | reverse driving brake (42) | forward-reverse shift clutch (68) |
| --- | --- | --- | --- |
| P | X | X | X |
| R | X | O | O |
| N | X | X | X |
| D start | X | X | O |
| D cruise | O | X | O |

Thus, on the engine side shaft 52 of the automatic transmission, the three-element one-stage type of torque convertor having normal and reverse functions, said oil pump 70 producing a driving hydraulic pressure, the reverse driving brake 42, the forward-reverse shift clutch 68, and the driving side pulley 4 are positioned in line from the engine side, and the overall length of the non-stage automatic transmission can be smaller in size.

Additionally, normal and reverse output, both driven from the engine side shaft 52, are constantly achieved through the turbine runner 48 of the torque convertor. A driving or neutral phase can be selected by locking up or releasing the forward-reverse shift clutch 68, and the usability of the non-stage automatic transmission becomes higher.

Figure 2:
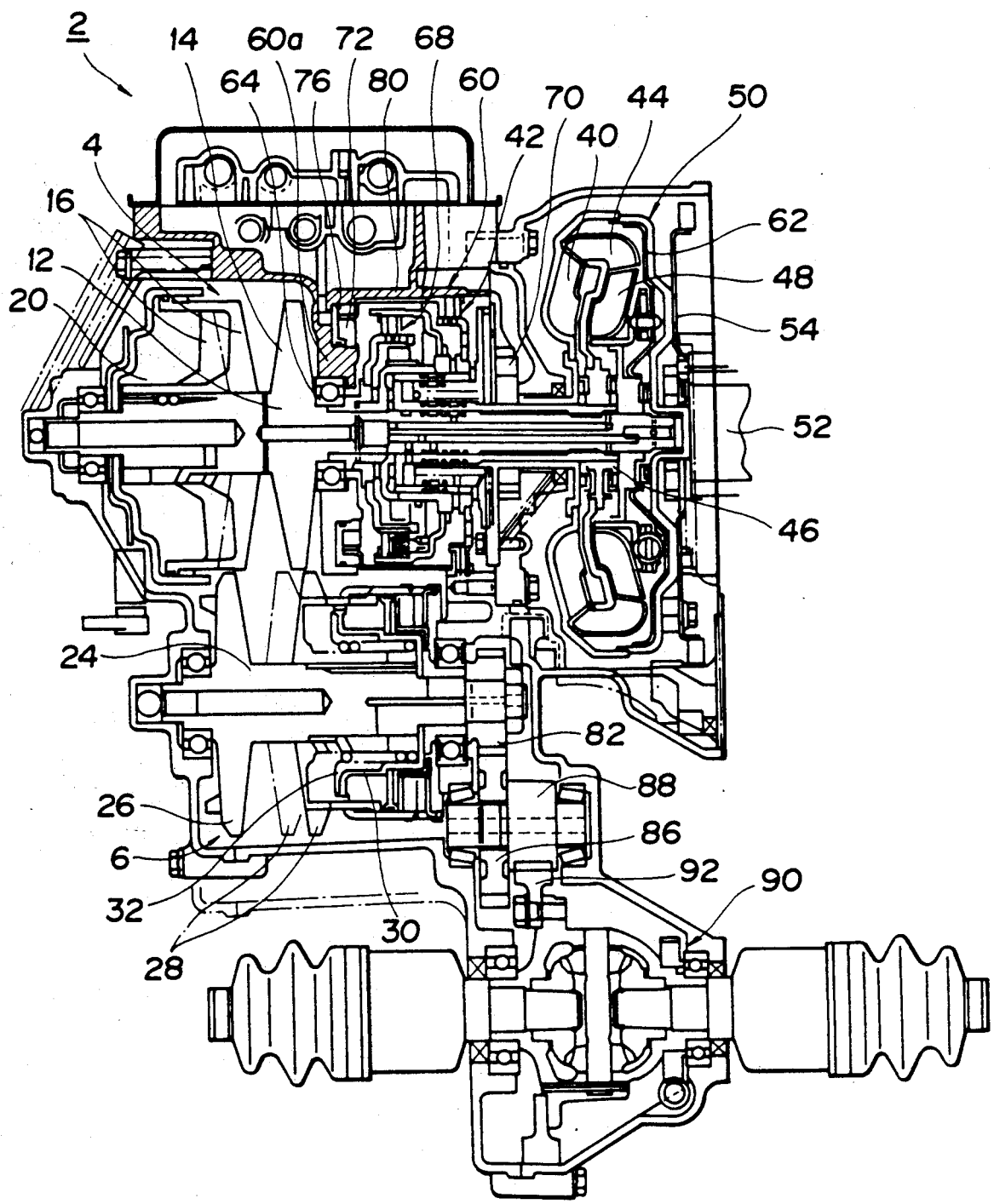
FIG. 2 is a detailed sectional view showing a non-stage transmission equipped with a fluid coupling.
Figure 3:
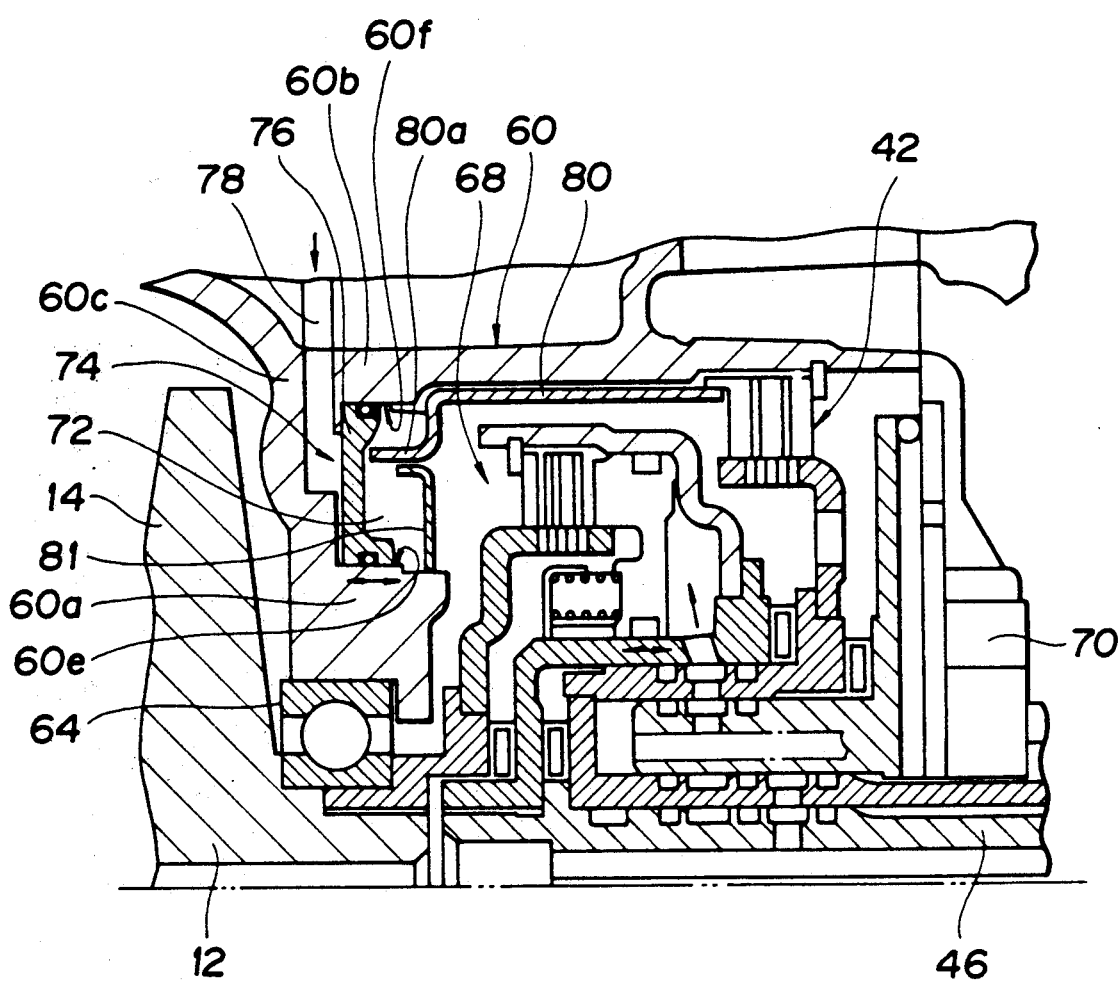
FIG. 3 is an enlarged fragmentary sectional view of FIG. 2.
Figure 4:
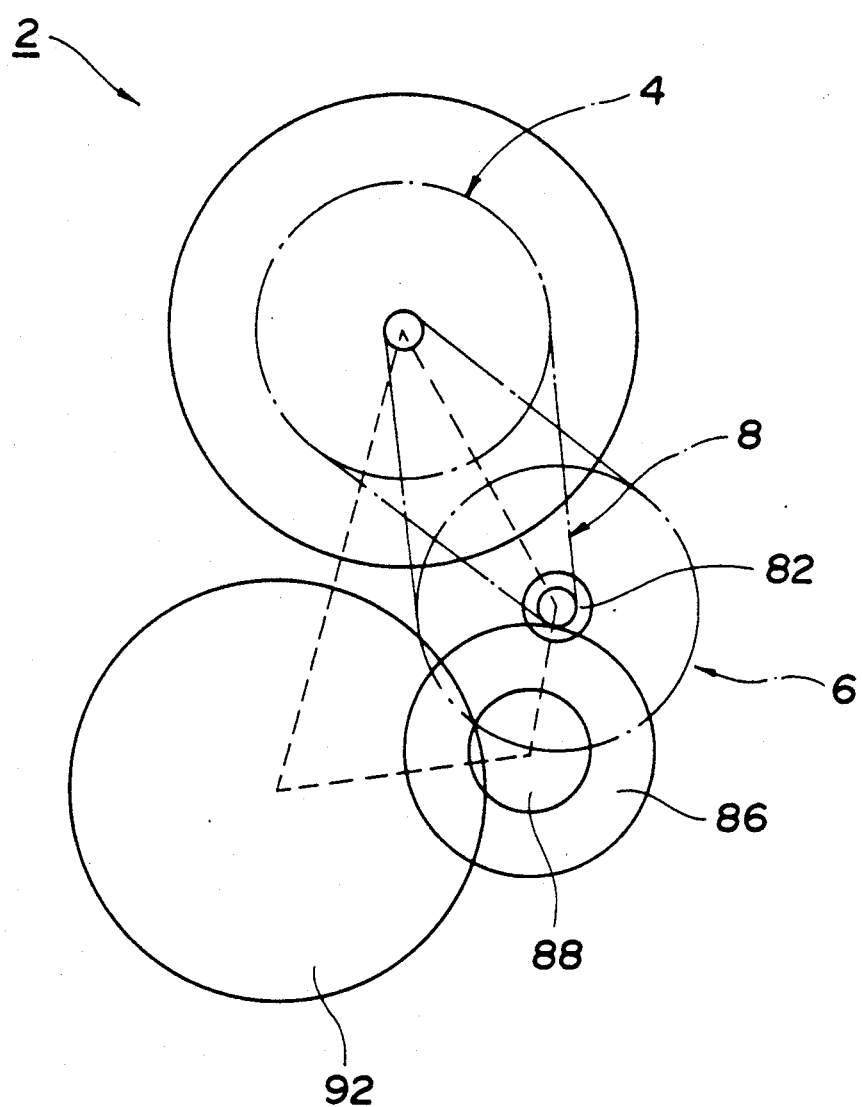
FIG. 4 is a schematic diagram showing the location of shafts.

Meanwhile, as shown in FIGS. 2 and 3, a retaining portion 60a supporting the bearing 64 is formed in the brake side casing 60. In a hollow cavity 72 formed between the retaining portion 60a and the covering portion 60b positioned in the axial direction of the output side shaft 46, a brake piston 76, a braking operator composing an operating mechanism 74 actuating the braking mechanism 42, is placed. The brake piston 76 is movable in the axial direction of the output side shaft 46 along the first sliding surface 60e of the retaining portion 60a and the second sliding surface 60f of the covering portion 60b which are parallel to the brake piston 76 by applying a hydraulic pressure through an oil passage 78 formed in the side portion 60c, and contacting with the end 80a of an operating ring 80 positioned outside of the neutral clutch 68. The brake piston 76 controls the operation of the braking mechanism 42 with the operating ring 80. That is, said operating mechanism 74 comprises the brake piston 76 and the operating ring 80.

Otherwise, a stopper 81 causes the brake piston 76 to stop moving.

The non-stage transmission 2 varies the contact radius of the belt 8 as engaged around the driving pulley 4 and the driven pulley 6, and thus changes the speed reduction ratio steplessly and controls speed.

Meanwhile, a reduction drive gear 82 is fixed on the reduction driven shaft 24, and a reduction driven gear 86 fixed on a supporting shaft 84 engages with the reduction drive gear 82. A final drive gear 88 is fixed on the supporting shaft 84, and a final gear 92 of a differential unit 90 engages with the final drive gear 88. The differential unit 90 is connected to wheels (not shown).

The internal combustion engine side shaft 52 rotates by the action of an internal combustion engine, and the rotation causes the drive plate 54 to rotate and the fluid coupling 50 to drive.

In the fluid coupling 50, when the removal of the brake piston 76 allows the braking mechanism 42 to release from the brake side casing 60 with the operating ring 80, the direct clutch 62 is able to be engaged and the stator wheel 44 is in free-wheeling rotation, and the oil freely passes through the vanes of the stator wheel 44 and hits the vanes of the turbine runner 48. Thus, the turbine runner 48 rotates in the same direction as the pump impeller 40 rotates, or in the normal direction (FIG. 5). Thus, the vehicle drives forward.

Otherwise, when the braking mechanism 42 is locked to the brake side casing 60, since the direct clutch 62 is not engaged and is locked and the stator wheel 44 stops rotating, the direction of oil flow is reversed by the vanes of the stator wheel 44, and the oil flows into the back of the turbine runner 48. Thus, the turbine runner 48 rotates in the direction reverse to the rotation of the pump impeller 40 (FIG. 6). Thus, the vehicle drives in reverse.

At this time, the oil pump 70 operates with the rotation of the internal combustion engine side shaft 52, sucks the oil from an oil pan (not shown), and supplies oil to the fluid coupling 50 and other portions.

Then, according to variations of the width of the driving side groove 22 of the driving side pulley 4 and the width of the driven side groove 34 of the driven side pulley 6, the non-stage transmission 2 changes the contact radius of the belt 8 and steplessly controls the speed reduction.

Thus, power of an internal combustion engine is output from the internal combustion engine shaft 52, and the direction of rotation of the belt 8 is decided according to the direction of the turbine runner 48 of the fluid coupling 50. Then, the power is in turn transmitted through the driving side pulley 4, the belt 8, the driven side pulley 6, the reduction drive gear 82, the reduction driven gear 86, the final drive gear 88, and finally is branched with the differential unit 90 and is transmitted to each wheel.

Meanwhile, in the embodiment, the space for placing the brake piston 76 is minimized by arranging the brake piston 76 in the hollow 72 of the brake side casing 60, and a saving of space is achieved. Accordingly, the overall length of the non-state transmission 2 can be minimized, and the compact non-stage transmission 2 can be composed. Thereby, the non-stage transmission 2 can be easily installed in the limited engine room.

Figure 8:
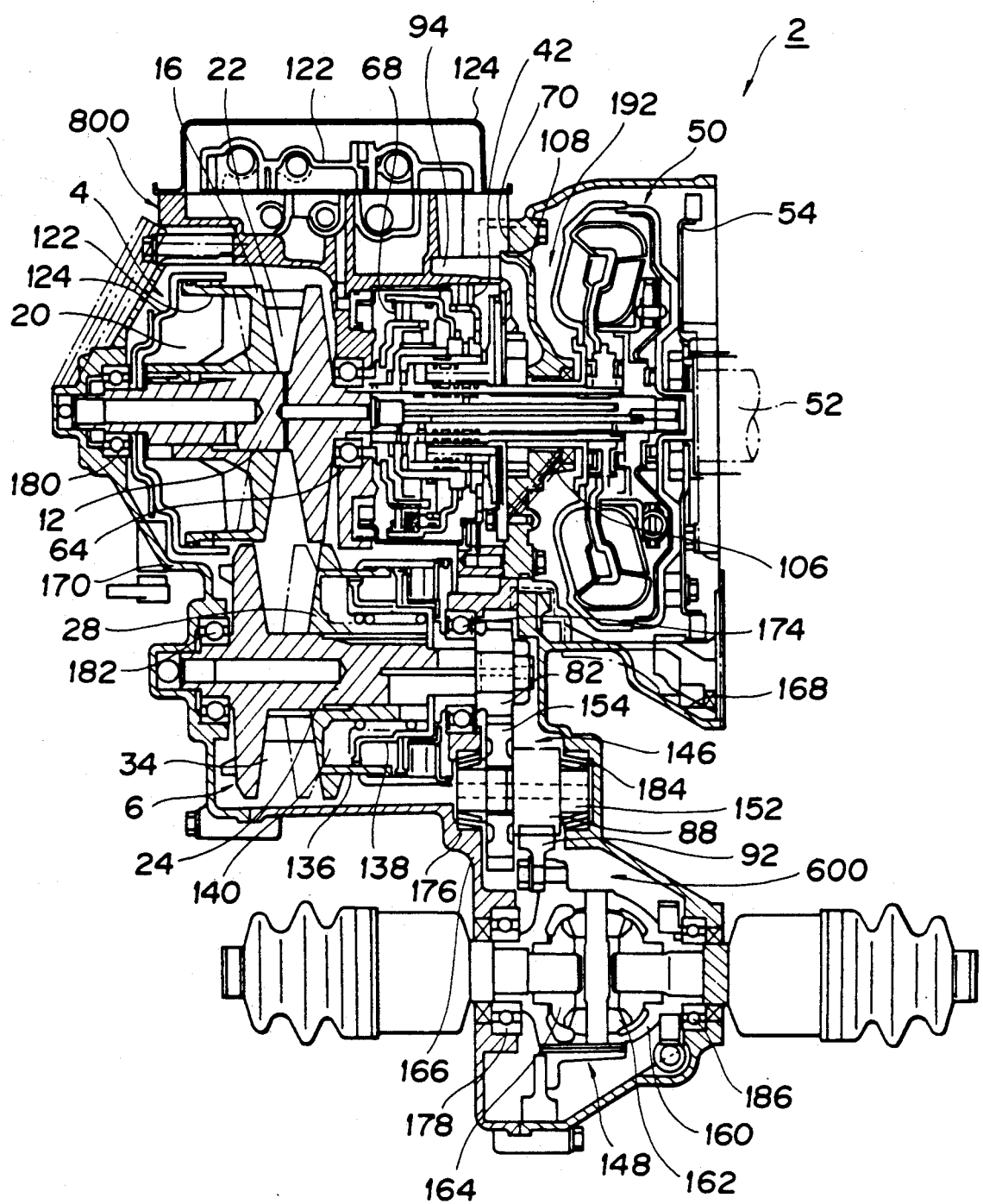
FIG. 8 is a sectional view showing a non-stage automatic transmission for a vehicle.
Figure 9:
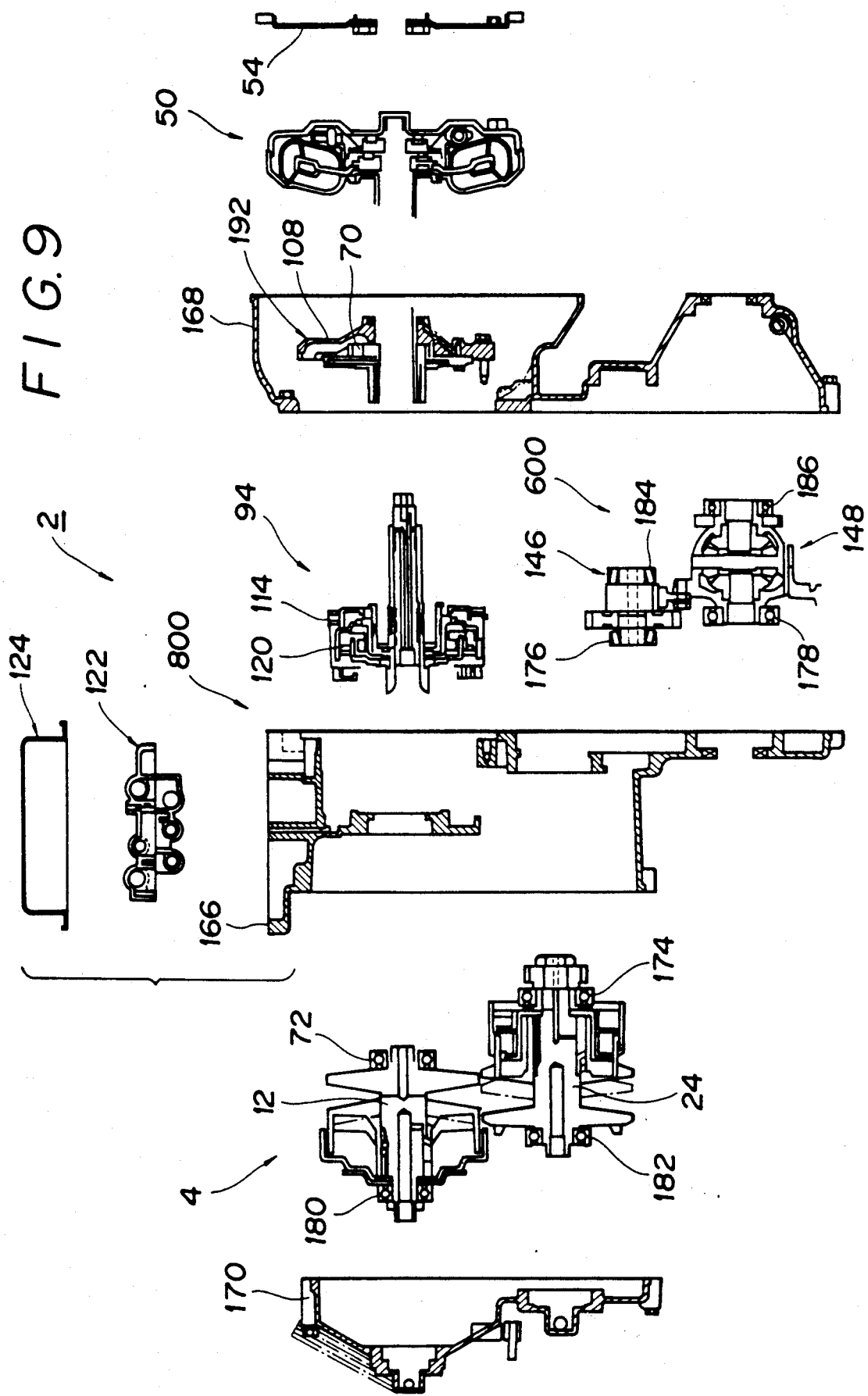
FIG. 9 is an sectional view showing a non-stage automatic transmission for a vehicle.

Referring to FIG. 8, which is generally similar to FIG. 2, another feature of the invention will be described. In some instances in FIGS. 8-14, parts which have previously been described are designated by the previously assigned references numerals.

Fluid pressure is applied to the hydraulic chamber 20 formed within moving cylinder 122 fixed on a back side of the pulley member 16, and a stationary cylinder 124 on which the moving cylinder 122 slides. The cylinder 124 is fixed on shaft 12, and the fluid pressure causes the pulley member 16 to move in the axial direction of the shaft 12, whereby groove width 22 is changed.

Moreover, fluid pressure is applied to a driven side hydraulic chamber 140 formed within a moving cylinder 136 fixed on a back side of the movable pulley member 28, and a stationary cylinder 138 on which the moving cylinder 136 slides. The cylinder 138 is fixed on said driven side shaft 24, and groove width 34 is changed by the fluid pressure in chamber 140.

A driving-power transmitting mechanism 600 comprises transfer gearing 146 and a differential gear mechanism 148. The transfer gearing 146 comprises a transfer drive gear 82 fixed on the driven side shaft 24 of the driven side pulley 6, a transfer driven gear 154 fixed on a rotatable transfer gear shaft 152 engaged with the transfer drive gear 82, a final drive gear 88 fixed on the transfer shaft 152, and a final driven gear 92 engaged with the final drive gear 88.

The differential gear mechanism 148 comprises a rotatable differential gear casing 160 having fixed thereon said final driven gear 92, and small differential gears 162 and large differential gear 164 placed in the differential gear casing 160.

As shown in FIG. 8, a transmission case 800 comprises a main case 166, a front case 168 fitted on the side of the main case close to the internal combustion engine (not shown), and a rear case 170 fitted on the side of the main case 166 opposite the internal combustion engine.

One end of each of the driving side shaft 12, the driven side shaft 24, the transfer gear shaft 152, and the differential gear case 160 is respectively supported, enclosed, and installed in said main case 166 through bearings 64, 174, 176, and 178. Moreover, the other ends of said driving side shaft 12, said driven side shaft 24, the transfer gear shaft 152, and the differential gear case 160 are, through respective bearings 180, 182, 184, and 186, supported, enclosed, and installed in either said front case 168 or said rear case 170. An oil pump mechanism 192 includes the oil pump 70 placed in an oil pump housing 108 through a connecting member 106. The oil pump housing 108 is installed in the main case 166.

A clutch-brake mechanism 94 includes the clutch 68 and the brake 42. Reference numeral 122 is a control valve mechanism and 124 is an oil pan enclosing the control valve mechanism 122.

One end of each of the driving side shaft 12, driven side shaft 24, (rotation shafts of said belt type transmission mechanism), the transfer gear shaft 152, (a rotation shaft of the transfer gear 146), and the differential gear case 160, (a rotation shaft of the differential gear mechanism 148), which compose the driving-power transmitting mechanism 600 is, through the respective bearings 64, 174, 176, and 178, supported, enclosed, and installed by said main case 166. The other ends of the driving side shaft 12 and driven side shaft 24 are, through the respective bearings 180 and 182, supported, enclosed, and installed by said rear case 170, and the other ends of the transfer gear shaft 152 and differential gear case 160, or rotation shafts, are, through the respective bearings 184 and 186, supported, enclosed, and installed bY said front case 168.

Therefore, since components referred to in the prior art as a subcase, a front cover, and a rear cover can be eliminated, the number of components composing a transmission case 180 can be decreased to fewer than the existing case, including an oil pan 124. Thus, costs can be reduced.

For convenience of illustration, the aforementioned parts of the transmission case 800 and the bearings housed therein are indicated in the diagrammatic view of FIG. 1.

In addition, removing either the front case 168 or the rear case 170 can make access to mechanisms easy.

Figure 10:
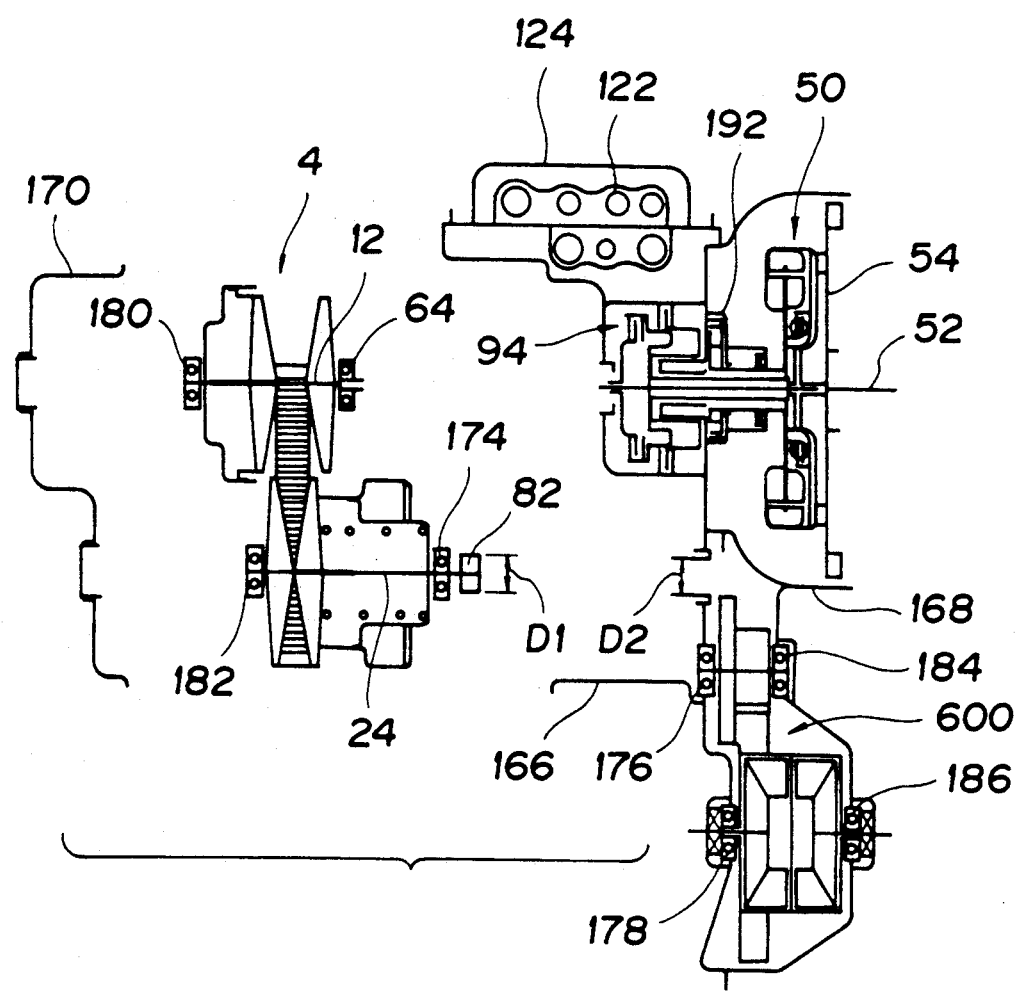
FIGS. 10-14 are explanatory drawings showing access procedures.

For example, as shown in FIG. 10, removing the rear case 170 out of the main case 166 allows easy access to the belt type transmission mechanism. Meanwhile, in this case, it is assumed that the diameter D1 of the transfer drive gear 82 fixed on the driven side shaft 24 of the driven pulley 6 is smaller than the diameter D2 of the hole formed inside of the main case 166 for the bearing 174.

Figure 11:
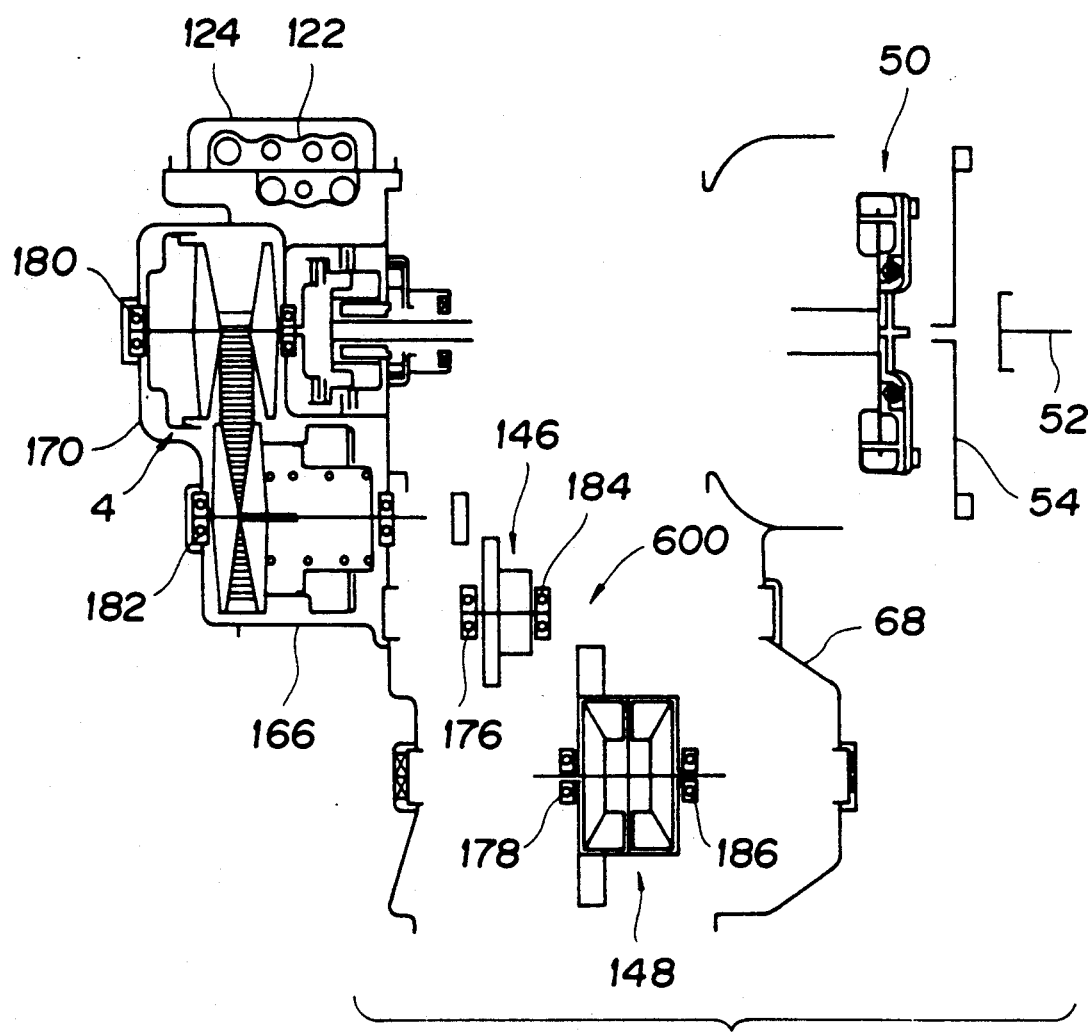

Also, as shown in FIG. 11, removing the front case 168 out of the main case 166 provides easy access to the transfer gearing 146 and differential gear mechanism 148 composing the driving-power transmitting mechanism. Meanwhile, in this case, before removing the front case 168, the internal combustion engine side shaft 52, the drive plate 54, and the fluid coupling mechanism 50 should be removed.

Thus, since removing either the front case 168 or the rear case 170 enables simple access to mechanisms, maintenance can be easily performed. Besides, it is obvious that the fluid coupling mechanism 50 can be removed without touching the belt type transmission mechanism 4, and therefore maintenance can be easily accomplished.

Figure 12:
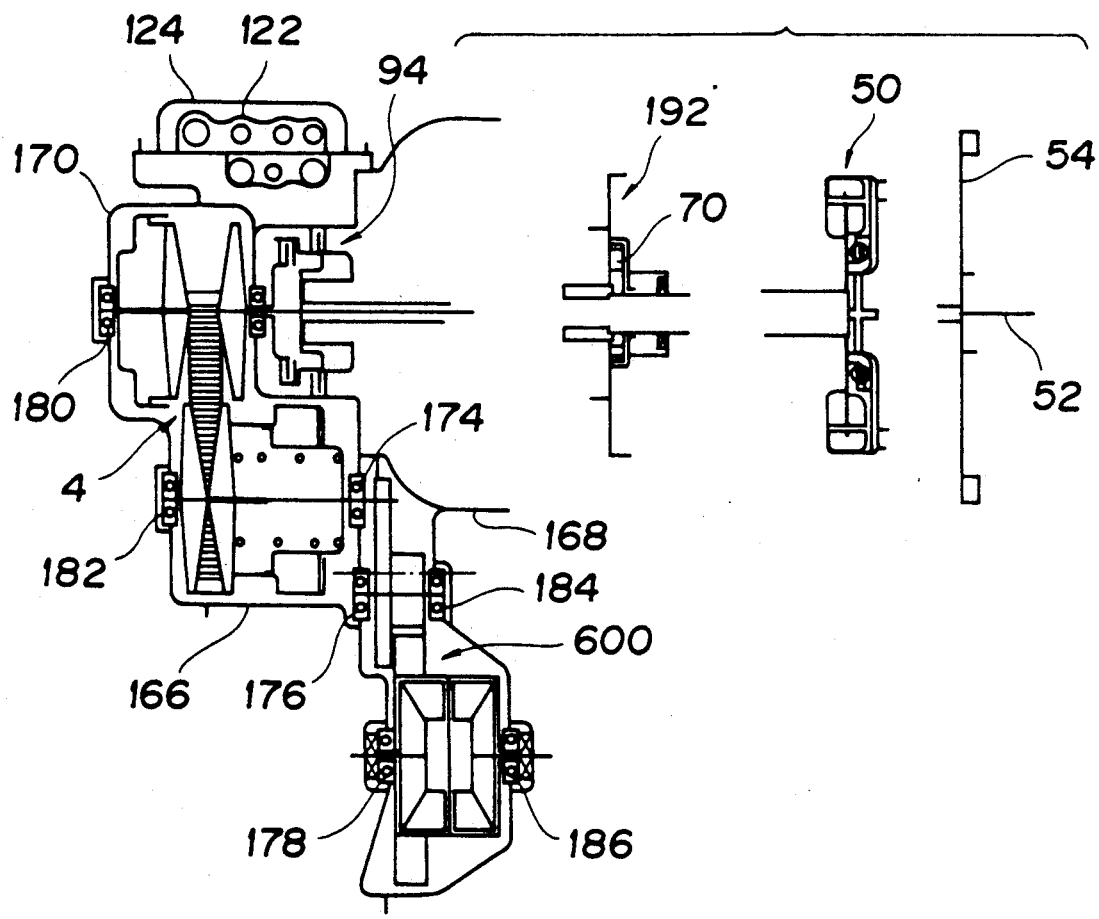

Moreover, as shown in FIG. 12, access to the oil pump 70 can be simply achieved by removing the oil pump housing 108 of the oil pump mechanism 192 from the main case 166.

Figure 13:
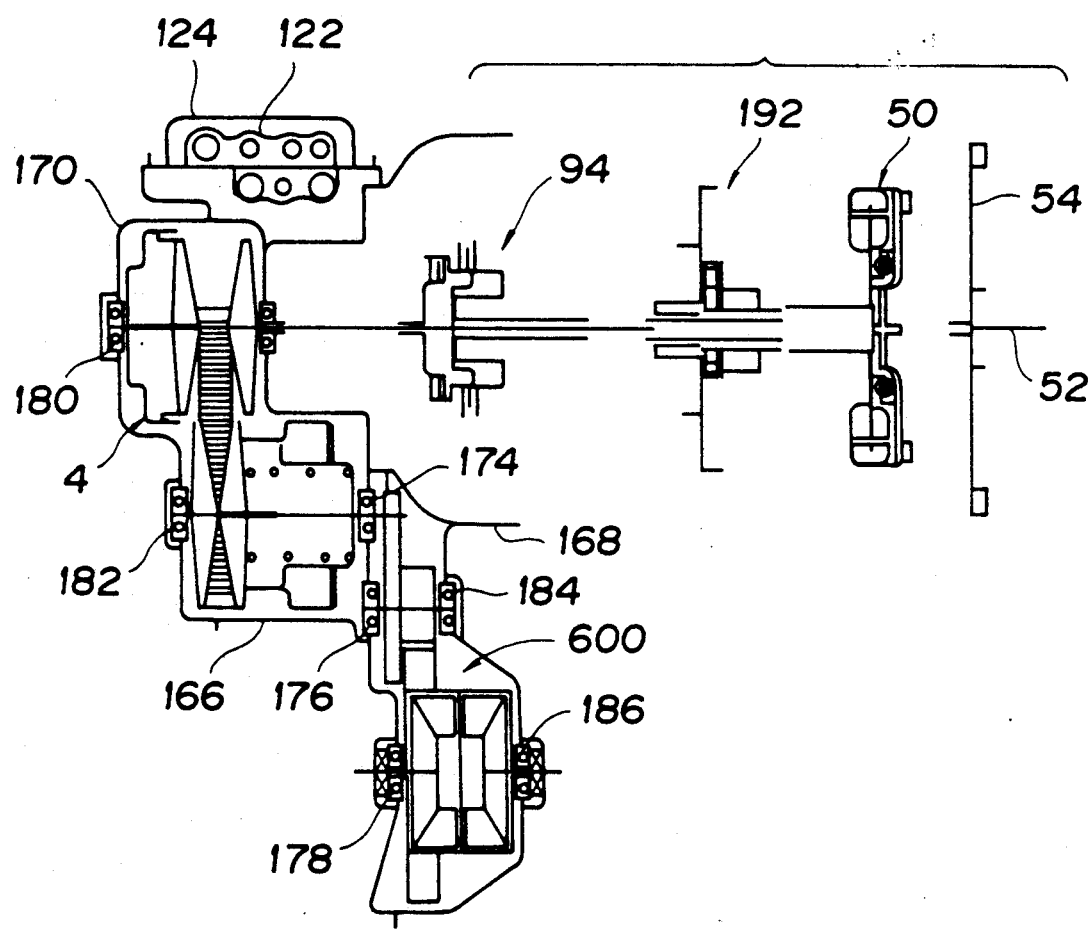

Furthermore, as shown in FIG. 13, removal of the oil pump mechanism 192 provides simple access to the clutch-brake mechanism 94.

Figure 14:
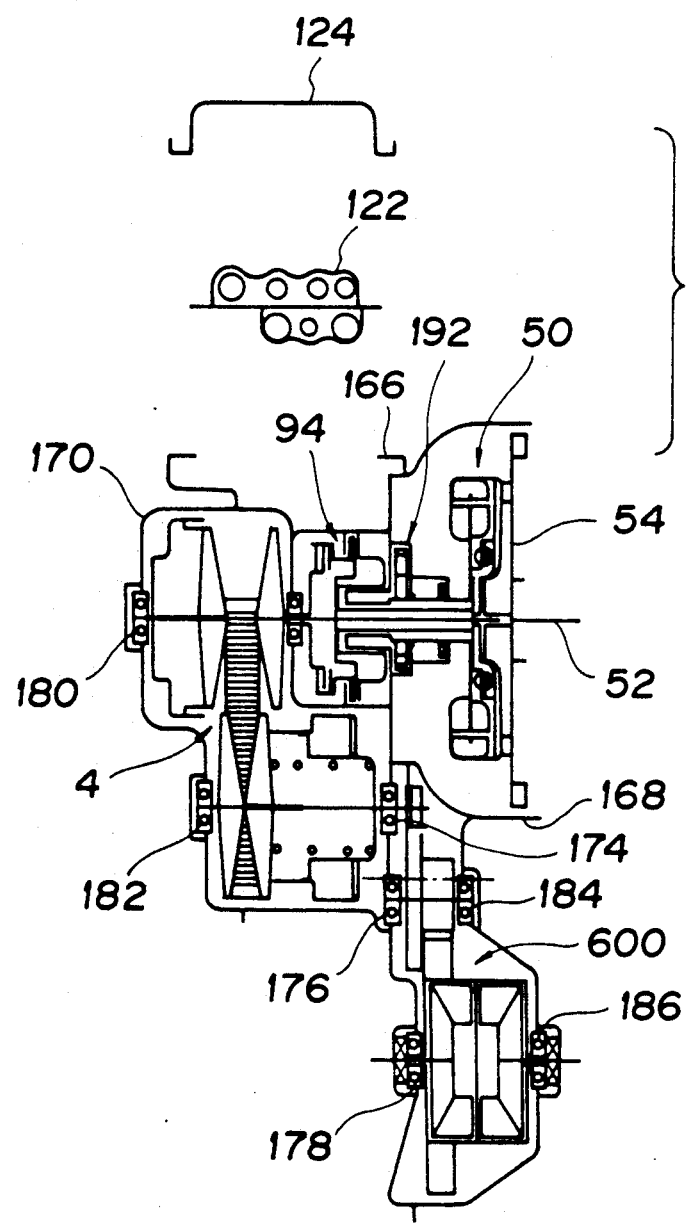
Figure 15:
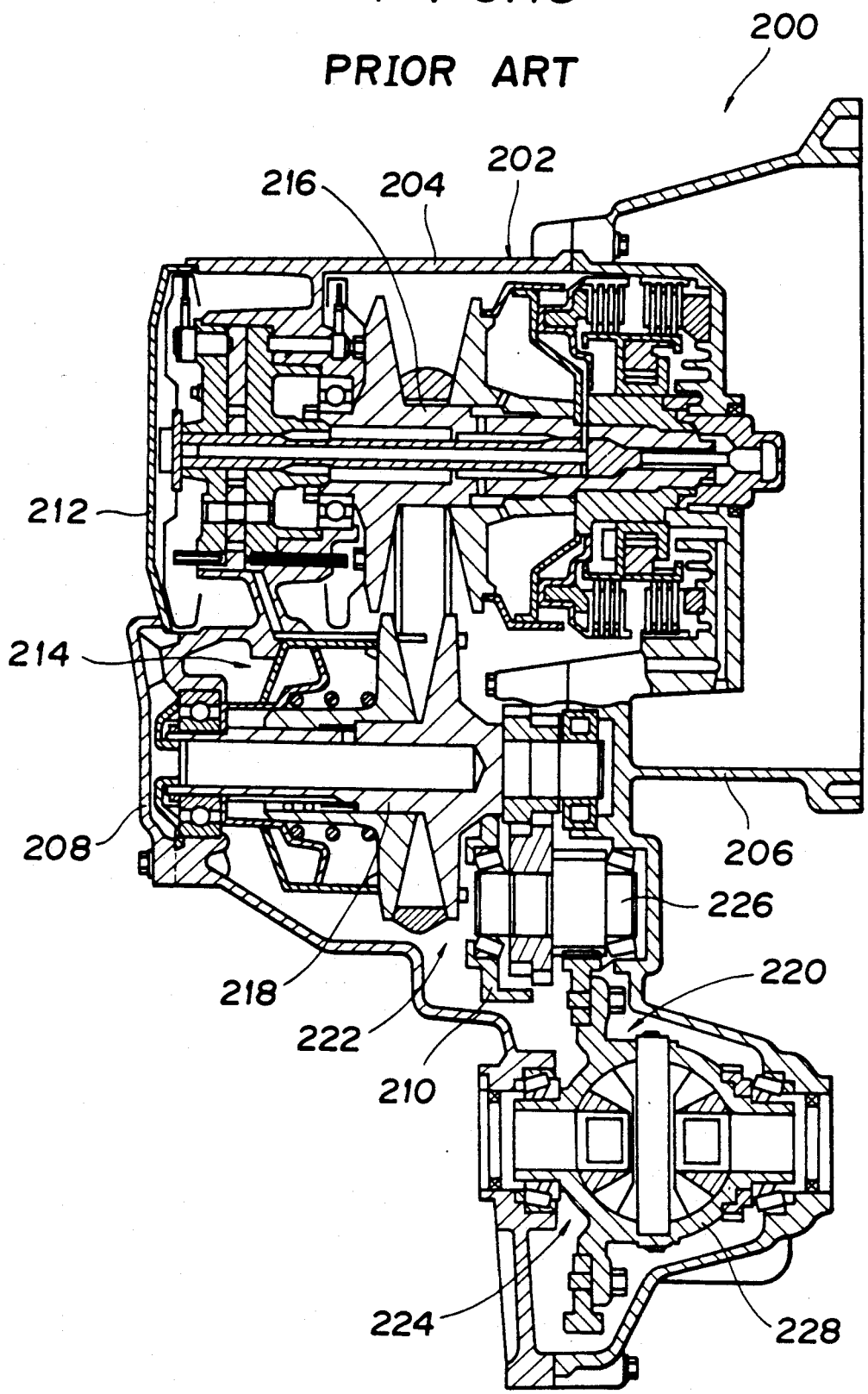
FIGS. 15-16 are sectional views showing a known non-stage automatic transmission.
Figure 16:
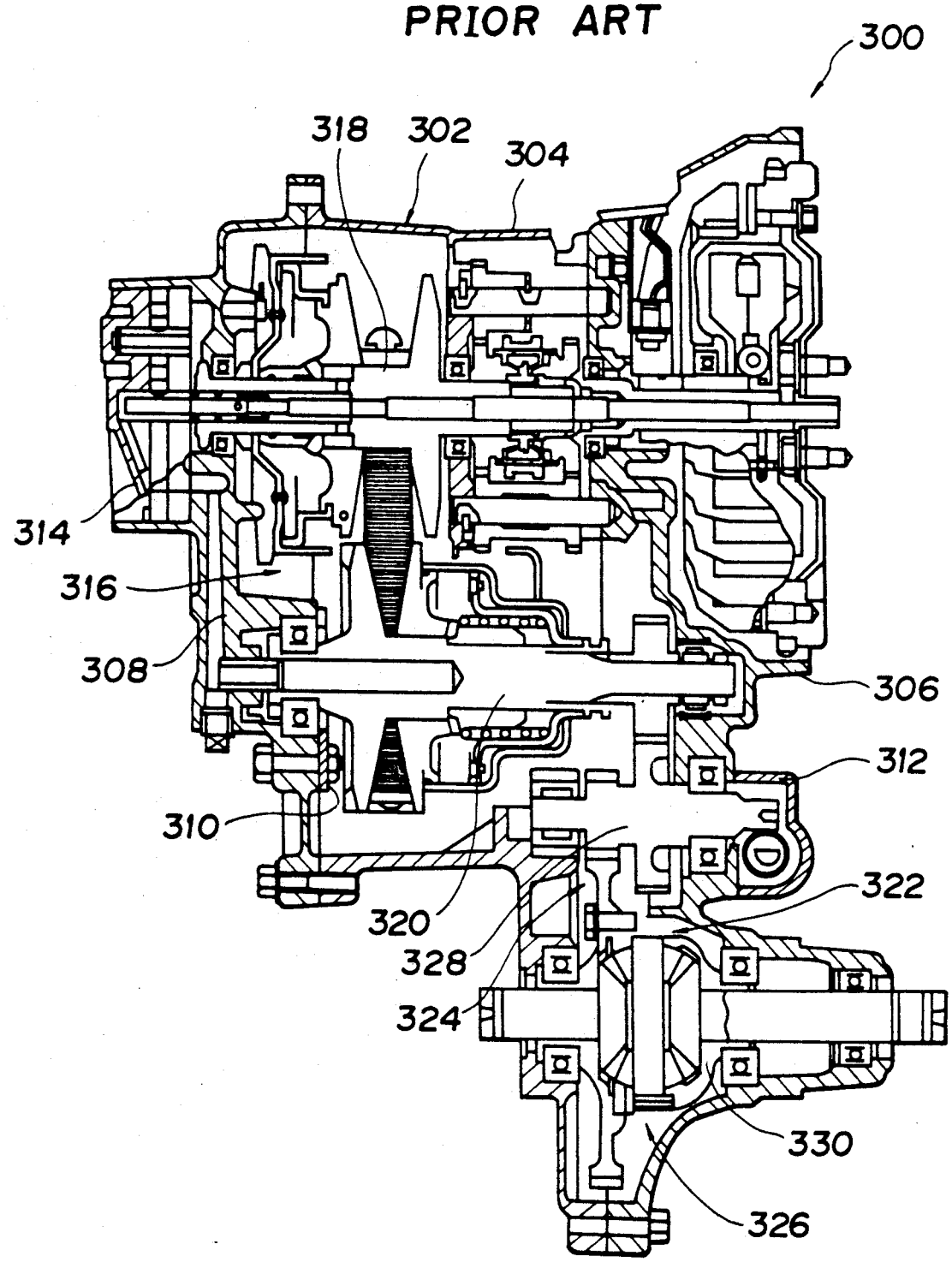

Also, the control valve mechanism 122, as shown in FIG. 14, will be easily accessible by removing the oil pan 124.

As described above, in the non-stage automatic transmission 2 according to the invention, simple access to mechanisms allows maintenance to be easily carried out, which is essential in practice.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a non-stage transmission for a vehicle that varies groove width of adjustable pulleys, said pulleys including an axially stationary pulley member and an axially movable pulley member supported so as to be capable of moving toward and away from the stationary pulley member for changing the contact radius with a belt wound around the pair of said pulleys to vary the speed reduction ratio and thereby control speed, the improvement comprising: a fluid coupling having a pump impeller drivingly connected with an internal combustion engine, a rotatably supported stator wheel lockable against rotation by a braking mechanism, and a rotatable turbine runner fixed on an output side shaft connected with one of said pulleys, said pump impeller, said stator well and said turbine runner being arranged in a casing and immersed in hydraulic fluid in said casing, said transmission being capable of rotating said turbine runner normally and reversely by releasing and locking the rotation of said stator wheel, a brake side casing which houses said braking mechanism, a braking operator of an operating mechanism which actuates said braking mechanism being fitted in a hollow cavity of said brake said casing, which cavity is formed by a retaining portion of said brake side casing, and a bearing supporting said output side shaft being seated on said retaining portion.

2. In a non-stage transmission for a vehicle that varies groove width of adjustable pulleys, said pulleys including an axially stationary pulley member and an axially movable pulley member supported so as to be capable of moving toward and away from the stationary pulley member for changing the contact radius with a belt wound around the pair of said pulleys to vary the speed reduction ratio and thereby control speed, the improvement comprising:

a fluid coupling rotatably drivingly connected to an engine output shaft and having normal and reverse rotational drive modes, a fluid coupling output shaft drivingly connected to said fluid coupling for providing a rotational output therefrom, an oil pump for producing a driving hydraulic pressure for use in said fluid coupling, a reverse driving brake means cooperable with said fluid coupling for selectively actuating said normal and reverse modes thereof, means for rotationally connecting said fluid coupling to said brake means, and a forward-reverse shift clutch for selectively rotatably drivingly connected said fluid coupling output shaft to one of said pulleys; and said fluid coupling, said oil pump, said brake means said clutch and said one pulley being positioned in the aforementioned sequential order along said fluid coupling output shaft, said fluid coupling being closest to said engine output shaft.

3. In a non-stage transmission for a vehicle, including a belt wound around adjustable driving said and driven side pulleys, said transmission varying the contact radius of the belt by applying hydraulic pressure to the pulleys, for changing the reduction ratio and thereby controlling speed, the improvement comprising:

a fluid coupling having a pump impeller rotatably drivingly connected to an engine output shaft, a rotatably supported stator lockable against rotation by a brake, and a rotatable turbine runner, said pump impeller, said tataor and said trubine runner being arranged in a casing and immersed in hydraulic fluid in said casing, a drive shaft rotatably dringinly connecting said turbine runner to one of said pulleys, and a direct clutch fitted into said fluid coupling casing to prevent cavitation, said direct clutch being actuable to drivingly connect said turbine runner to said pump impeller; and said pump impeller, said ator, said turbine runner and said direct clutch being positioned in said casing in the afore-mentioned sequential order relative to a direction of hydraulic fluid circulation in said casing as caused by rotation of said pump impeller.

* * * * *

UNITED STATES PATENT AND TRADEMARK OFFICE
CERTIFICATE OF CORRECTION

PATENT NO.  :  5 032 108
DATED       :  July 16, 1991
INVENTOR(S) :  Katuhiko Taniguchi et al It is certified that error appears in the above-identified patent and that said Letters Patent is hereby corrected as shown below:

Column 11, line 56; change "said" (second occurrence) to ---side---.

Column 12, line 25; change "connected" to ---connecting---.

Column 12, line 33, change "said" to --side--.

Column 12, lines 44 and 45; change "drin-ginly" to ---drivingly---.

Signed and Sealed this

Second Day of March, 1993

*Attest:*

STEPHEN G. KUNIN

*Attesting Officer*      *Acting Commissioner of Patents and Trademarks*